United States Patent
Drake et al.

[11] Patent Number: 6,083,865
[45] Date of Patent: *Jul. 4, 2000

[54] HYDROCARBON CONVERSION CATALYST COMPOSITION AND PROCESSES THEREFOR AND THEREWITH

[75] Inventors: Charles A. Drake, Nowata; An-hsiang Wu; Jianhua Yao, both of Bartlesville, all of Okla.

[73] Assignee: Phillips Petroleum Company, Bartlesville, Okla.

[ * ] Notice: This patent is subject to a terminal disclaimer.

[21] Appl. No.: 09/172,642

[22] Filed: Oct. 14, 1998

Related U.S. Application Data

[60] Division of application No. 08/919,987, Aug. 28, 1997, Pat. No. 5,898,089, which is a continuation-in-part of application No. 08/890,540, Jul. 9, 1997, Pat. No. 5,883,033.

[51] Int. Cl.$^7$ ..................................................... B01J 29/06
[52] U.S. Cl. ............................... 502/68; 502/60; 502/62; 502/63; 502/64; 502/68; 502/77; 502/80; 502/84
[58] Field of Search ............................ 502/60, 62, 64, 502/63, 68, 77, 80, 84

[56] References Cited

U.S. PATENT DOCUMENTS

| | | | |
|---|---|---|---|
| 3,962,364 | 6/1976 | Young | 502/60 |
| 4,478,949 | 10/1984 | Kaeding | 502/77 |
| 5,883,033 | 3/1999 | Drake et al. | 502/68 |
| 5,883,034 | 3/1999 | Drake et al. | 502/68 |

*Primary Examiner*—Elizabeth D. Wood
*Attorney, Agent, or Firm*—Richmond, Hitchcock, Fish & Dollar

[57] ABSTRACT

A catalyst composition, a process for producing the composition, and a hydrotreating process for converting a hydrocarbon stream such as, for example, gasoline, to olefins and $C_6$ to $C_8$ aromatic hydrocarbons such as toluene and xylenes are disclosed. The catalyst composition comprises a zeolite, a clay, and a promoter. The process for producing the composition comprises the steps: (1) combining a zeolite with a clay and a promoter under a condition sufficient to bind the clay to the zeolite to produce a clay-bound zeolite; and (2) heating the clay-bound zeolite to produce a modified zeolite. The hydrotreating process comprises contacting a hydrocarbon stream with the catalyst composition under a condition sufficient to effect the conversion of a hydrocarbon to an olefin and a $C_6$ to $C_8$ aromatic hydrocarbon.

7 Claims, No Drawings

6,083,865

HYDROCARBON CONVERSION CATALYST COMPOSITION AND PROCESSES THEREFOR AND THEREWITH

This application is a division of application Ser. No. 08/919,987, filed Aug. 28, 1997 now U.S. Pat. No. 5,898,089, which is a continuation-in-part application of Ser. No. 08/890,540, filed Jul. 9, 1997, now U.S. Pat. No. 5,883,033.

FIELD OF THE INVENTION

This invention relates to a composition useful for converting a hydrocarbon to a $C_6$ to $C_8$ aromatic hydrocarbon and an olefin, to a process for producing the composition, and to a process for using the composition for converting a hydrocarbon to a $C_6$ to $C_8$ aromatic hydrocarbon and an olefin.

BACKGROUND OF THE INVENTION

It is well known to those skilled in the art that aromatic hydrocarbons and olefins are each a class of very important industrial chemicals which find a variety of uses in petrochemical industry. It is also well known to those skilled in the art that catalytically cracking gasoline-range hydrocarbons produces lower olefins such as, for example, propylene; and aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5$+alkanes; lower alkanes such as methane, ethane, and propane; lower alkenes such as ethylene and propylene; $C_6$–$C_8$ aromatic hydrocarbons; and $C_9$+aromatic compounds which contain 9 or more carbons per molecule. Recent efforts to convert gasoline to more valuable petrochemical products have therefore focused on improving the conversion of gasoline to olefins and aromatic hydrocarbons by catalytic cracking in the presence of zeolite catalysts. For example, a gallium-promoted zeolite ZSM-5 has been used in the so-called Cyclar Process to convert a hydrocarbon to BTX.

Olefins and aromatic hydrocarbons can be useful feedstocks for producing various organic compounds and polymers. However, the weight ratio of olefins to aromatic compounds produced by the conversion process is generally less than 50%. Additionally, a zeolite catalyst is generally deactivated in a rather short period, especially in a high sulfur and/or high polyaromatic environment, because of depositions of carbonaceous material, generally coke, on the surface of the catalyst. Moreover, the BTX purity in the product is generally not desirably high. Therefore, development of a catalyst and a process for converting hydrocarbons to the more valuable olefins and BTX and for reducing coke deposition would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon and an olefin. Also an object of this invention is to provide a process for producing the catalyst composition. Another object of this invention is to provide a process which can employ the catalyst composition to convert a hydrocarbon to an olefin and a $C_6$ to $C_8$ aromatic hydrocarbon. An advantage of the catalyst composition is that it enhances the ratio of produced olefins to BTX. Another advantage of the catalyst composition is that it suppresses the deposition of coke during a hydrotreating process. Other objects and advantages will becomes more apparent as this invention is more fully disclosed hereinbelow.

According to a first embodiment of the present invention, a composition which can be used as a catalyst for converting a hydrocarbon or a hydrocarbon mixture to an olefin and a $C_6$ to $C_8$ aromatic hydrocarbon is provided. The composition comprises a zeolite, a binder such as clay, and optionally at least one metal or element selected from the group consisting of Group IA, Group IIA, Group IIIA, Group IVA, Group VA, Group IIB, Group IIIB, Group IVB, Group VIB, of the Periodic Table of the Elements, CRC Handbook of Chemistry and Elements, 67th edition, 1986–1987 (CRC Press, Boca Raton, Fla.), and combinations of two or more thereof.

According to a second embodiment of the present invention, a process which can be used for producing a catalyst composition is provided. The process comprises the steps: (1) optionally contacting a zeolite with steam whereby a steamed zeolite is formed; (2) optionally contacting a zeolite or the steamed zeolite with an acid in an amount and under a condition effective to produce an acid-leached zeolite; (3) combining a zeolite, which can also be the steamed zeolite or the acid-leached zeolite, with a clay and a promoter under a condition sufficient to bind the clay to the zeolite to produce a clay-bound zeolite; and (4) heat-treating the clay-bound zeolite to produce a modified zeolite wherein the promoter is selected from the group consisting of Group IA, Group IIA, Group IIIA, Group IVA, Group VA, Group IIB, Group IIIB, Group IVB, Group VIB, of the Periodic Table of the Elements, CRC Handbook of Chemistry and Elements, 67th edition, 1986–1987 (CRC Press, Boca Raton, Fla.), and combinations of two or more thereof.

According to a third embodiment of the present invention, a process which can be used for converting a hydrocarbon or a hydrocarbon mixture to an olefin and a $C_6$ to $C_8$ aromatic hydrocarbon is provided which comprises, consists essentially of, or consists of, contacting a fluid which comprises a hydrocarbon or a hydrocarbon mixture with a catalyst composition, which can be the same as disclosed above in the first embodiment of the invention, under a condition effective to convert a hydrocarbon to an olefin and an aromatic hydrocarbon containing 6 to 8 carbon atoms per molecule wherein the weight ratio of the olefin to aromatic compound is enhanced.

DETAILED DESCRIPTION OF THE INVENTION

The catalyst composition of the first embodiment of the present invention can comprise, consist essentially of, or consist of a zeolite and a clay. According to the present invention the weight ratio of clay to zeolite can be any ratio that can enhance the production of an olefin from a hydrocarbon and can be in the range of from about 1:20 to about 20:1, preferably about 1:10 to about 10:1, and most preferably about 1:7 to about 5:1. The composition can also comprise, consist essentially of, or consist of, a zeolite, a clay, and a promoter selected from the group consisting of Group IA, Group IIA, Group IIIA, Group IVA, Group VA, Group IIB, Group IIIB, Group IVB, Group VIB, of the Periodic Table of the Elements, and combinations of two or more thereof. The term "promoter" refers to a compound, a metal, or an element that, when incorporated in a zeolite, can suppress coke formation, or enhance olefin production, or both, in a hydrocarbon conversion process. The term "metal or element" used herein also includes a compound of the metal or element. For the interest of simplicity, any references to "metal" in the application, unless otherwise indicated, will include the elements listed above and a compound of any of the elements.

The weight ratio of each promoter to zeolite can be any ratio as long as the ratio can suppress the coke formation during a hydrocarbon conversion process. Generally, the ratio can be in the range of from about 0.01:1 to about 1:1, preferably about 0.03:1 to about 1:1, and most preferably 0.04:1 to 0.5:1. The composition can also comprise, consist essentially of, or consist of a zeolite, a clay, a promoter, and a binder. The weight of the binder generally can be in the range of from about 1 to about 50, preferably about 5 to about 40, and most preferably 5 to 35 grams per 100 grams of the composition.

Any binders known to one skilled in the art for use with a zeolite are suitable for use herein. Examples of suitable binders include, but are not limited to, aluminas such as for example α-alumina and γ-alumina; silicas; alumina-silica; aluminum phosphate; aluminum chlorohydrate; and combinations of two or more thereof. Because these binders are well known to one skilled in the art, description of which is omitted herein. The presently preferred binder, if employed, is alumina because it is readily available.

The composition can further be characterized by having the following physical characteristics: a surface area as determined by the BET method using nitrogen in the range of from about 300 to about 600, preferably 350 to 500 m$^2$/g; a pore volume in the range of from about 0.4 to about 0.8, preferably about 0.5 to about 0.75, and most preferably 0.6 to 0.75 ml/g; an average pore diameter in the range of from about 70 to about 300, preferably about 100 to about 250, and most preferably 125 to 200 A; and a porosity of more than about 50%.

Any clay that can enhance the production of olefins in the conversion of a hydrocarbon to an aromatic compound can be used. Examples of clays include, but are not limited to, kaolinite, halloysite, vermiculite, chlorite, attapulgite, smectite, montmorillonite, illite, saconite, sepiolite, palygorskite, and combinations of any two or more thereof. The presently preferred clay is montmorillonite which is commonly present in bentonite.

According to the present invention, any compound containing a metal or element selected from the group consisting of Group IA, Group IIA, Group IIIA, Group IVA, Group VA, Group IIB, Group IIIB, Group IVB, Group VIB, of the Periodic Table of the Elements, and combinations of two or more thereof can be used as promoter. Illustrated hereinbelow are some examples of suitable promoters.

Any zinc-containing compounds which can, when incorporated into a zeolite, reduce coke formation in a hydrocarbon conversion reaction can be used in the present invention. Examples of suitable zinc-containing compounds include, but are not limited to, zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc phosphate, zinc acetate dihydrate, diethylzinc, zinc 2-ethylhexanoate, and combinations of two or more thereof.

Also any titanium-containing compounds that, when incorporated into a zeolite, reduce coke formation in a hydrocarbon conversion reaction can be employed in the invention. Examples of suitable titanium-compounds include, but are not limited to, titanium zinc titanate, lanthanum titanate, titanium tetramides, titanium tetramercaptides, titanium chloride, titanium oxalate, zinc titanate, tetraisopropyl titanate, tetra-n-butyl titanate, tetrakis(2-ethylhexyl) titanate, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, titanium tetraphenoxide, and combinations of two or more thereof.

Similarly, examples of suitable magnesium-containing compounds include, but are not limited to, magnesium silicate, magnesium nitrate, magnesium acetate, magnesium acetylacetoante, magnesium chloride, magnesium molybdate, magnesium hydroxide, magnesium sulfate, magnesium sulfide, magnesium titanate, magnesium tungstate, magnesium formate, magnesium bromide, magnesium bromide diethyl etherate, magnesium fluoride, dibutyl magnesium, magnesium methoxide, $Mg(OC_2H_5)_2$, $Mg(OSO_2CF_3)_2$, dipropyl magnesium, and combinations of two or more thereof.

Generally any silicon-containing compounds which are effective to suppress coke formation on a zeolite in a hydrocarbon conversion process can be used in the present invention. Examples of suitable silicon-containing compounds can have a formula of $(R)(R)(R)Si-(O_mSi(R)(R))_nR$ wherein each R can be the same or different and is independently selected from the group consisting of hydrogen, alkyl radicals, alkenyl radicals, aryl radicals, alkaryl radicals, aralkyl radicals, and combinations of any two or more thereof; m is 0 or 1; and n is 1 to about 10 wherein each radical can contain 1 to about 15, preferably 1 to about 10 carbon atoms per radical. Specific examples of such compounds include, but are not limited to, silicon-containing polymers such as poly(phenylmethylsiloxane), poly(phenylethylsiloxane), poly(phenylpropylsiloxane), hexamethyldisiloxane, decamethyltetrasiloxane, diphenyltetramethyldisiloxane, and combinations of any two or more thereof. Other silicon-containing compounds include organosilicates such as, for example, tetraethyl orthosilicate. A number of well known silylating agents such as trimethylchlorosilane, chloromethyldimethylchlorosilane, N-trimethylsilylimidazole, N,O-bis(trimethylsilyl)acetimide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, [3-(2-aminoethyl)aminopropyl]trimethoxysilane, cyanoethyltrimethoxysilane, aminopropyltriethoxysilane, phenyltrimethoxysilane, (3-chloropropyl)trimethoxysilane, (3-mercaptopropyl)trimethoxysilane, (3-glycidoxypropyl)trimethoxysilane, vinyltris(β-methoxyethoxy)silane, (γ-methacryloxypropyl)trimethoxysilane, vinylbenzyl cationic silane, (4-aminopropyl)triethoxysilane, [γ-(β-aminoethylamino)propyl]trimethoxysilane, (γ-glycidoxypropyl)trimethoxysilane, [β-(3,4-epoxycyclohexyl)ethyl]trimethoxysilane, (β-mercaptoethyl)trimethoxysilane, (γ-chloropropyl)trimethoxysilane, and combinations of any two or more thereof can also be employed. The presently preferred silicon-containing compounds are tetraethyl orthosilicate and poly(phenylmethyl) siloxane.

Similarly, any phosphorus-containing compounds that, when impregnated onto or incorporated into a metal oxide-promoted alumina can be converted into a phosphorus oxide, are capable of reducing coke deposition on a metal oxide-promoted alumina, as compared to the use of the metal oxide-promoted alumina only, can be used in the present invention. Examples of suitable phosphorus-containing compounds include, but are not limited to, phosphorus pentoxide, phosphorus oxychloride, phosphoric acid, phosphites $P(R)_3$ such as triethyl phosphite $P(OR)_3$, phosphates $P(O)(OR)_3$ such as triethyl phosphate and tripropyl phosphate, $P(O)(R)_3$, phosphines $P(R)_3$, and combinations of any two or more thereof wherein R is the same as that disclosed above.

Examples of suitable boron-containing compounds include, but are not limited to boric acid, borane-ammonium complex, boron trichloride, boron phosphate, boron nitride, triethyl borane, trimethyl borane, tripropyl borane, trimethyl borate, triethyl borate, tripropyl borate, trimethyl boroxine, triethyl boroxine, tripropyl boroxine, and combinations of any two or more thereof.

Similarly, examples of suitable tin-containing compounds include, but are not limited to, stannous acetate, stannic acetate, stannous bromide, stannic bromide, stannous chloride, stannic chloride, stannous oxalate, stannous sulfate, stannic sulfate, stannous sulfide, and combinations of any two or more thereof.

Similarly, examples of suitable zirconium-containing compounds include, but are not limited to, zirconium acetate, zirconium formate, zirconium chloride, zirconium bromide, zirconium butoxide, zirconium tert-butoxide, zirconium chloride, zirconium citrate, zirconium ethoxide, zirconium methoxide, zirconium propoxide, and combinations of any two or more thereof.

Suitable molybdenum-containing compounds include, but are not limited to, molybdenum chloride, molybdenum acetate, molybdenum fluoride, molybdenum oxychloride, molybdenum sulfide, ammonium heptamolybdate and combinations of two or more thereof.

Examples of suitable germanium-containing compounds include, but are not limited to, germanium chloride, germanium bromide, germanium ethoxide, germanium fluoride, germanium iodide, germanium methoxide, and combinations of any two or more thereof.

Examples of suitable indium-containing compounds include, but are not limited to indium acetate, indium bromide, indium chloride, indium fluoride, indium iodide, indium nitrate, indium phosphide, indium selenide, indium sulfate, and combinations of any two or more thereof.

Examples of suitable lanthanum-containing compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, tanthanum titanate, and combinations of any two or more thereof.

Examples of suitable chromium containing compounds include, but are not limited to, chromium acetate, chromium acetylacetonate, chromium chloride, chromium fluoride, chromium hexacarbonyl, chromium nitrate, chromium nitride, chromium 2,4-pentanedionate, chromium perchlorate, chromium potassium sulfate, chromium sulfate, chromium telluride, and combinations of two or more thereof.

Other suitable promoter compounds include, but are not limited to, sodium acetate, sodium acetylacetonate, sodium bromide, sodium iodide, sodium nitrate, sodium sulfate, sodium sulfide, potassium acetate, potassium acetylacetonate, potassium bromide, potassium chloride, potassium nitrate, potassium octanoate, potassium phosphate, potassium sulfate, tungsten bromide, tungsten chloride, tungsten hexacarbonyl, tungsten oxychloride, tungsten sulfide, tungstic acid, and combinations of any two or more thereof.

Any commercially available zeolite which can catalyze the conversion of a hydrocarbon to an aromatic compound and an olefin can be employed in the present invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 138–139 (Butterworth-Heineman, Boston, Mass., 3rd ed. 1992). Optionally a zeolite can be steam—and/or acid—treated before using the present invention. The presently preferred zeolites are those having medium pore sizes and having the physical characteristics disclosed above. ZSM-5 and similar zeolites that have been identified as having a framework topology identified as MFI are particularly preferred because of their shape selectivity.

The composition of the present invention can be prepared by combining a zeolite, a clay, a promoter, and optionally a binder in the weight ratios or percent disclosed above under any conditions sufficient to effect the production of such a composition.

According to the present invention, a zeolite, preferably a ZSM-5 zeolite, a clay, a promoter, and optionally binder can be well mixed at about 15 to about 100° C. under atmospheric pressure, generally in a liquid such as water or a hydrocarbon, by any means known to one skilled in the art such as stirring, blending, kneading, or extrusion, following which the resulting mixture can be dried in air at a temperature in the range of from about 20 to about 800° C., for about 0.5 to about 50 hours under any pressures that accommodate the temperatures, preferably under atmospheric pressure. Thereafter, the dried, zeolite-binder mixture can be further heat-treated at a temperature in the range of from about 200 to 1000° C., preferably about 250 to about 750° C., and most preferably 350 to 650° C. for about 1 to about 30 hours to prepare the present composition. The heat treatment can be carried out by air calcination or steam.

Generally a zeolite, before a binder is combined with the zeolite, can also be calcined under similar conditions to remove any contaminants, if present, to prepare a calcined zeolite.

A zeolite, whether it has been calcined or contains a binder, can also be treated with steam. The treatment of a zeolite, which can contain a binder, with steam can be carried out in any suitable container or vessel known to one skilled in the art at about 100° C. to about 1000° C. for about 1 to about 30 hours under any pressure that can accommodate the temperatures to produce a steamed zeolite.

A zeolite, whether it has been steamed or not, can be treated with an acid before the preparation of the present composition. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to sulfuric acid, hydrochloric acid, nitric acid, phosphoric acid, formic acid, acetic acid, oxalic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of any two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations thereof.

Any methods known to one skilled in the art for treating a solid catalyst with an acid can be used in the acid treatment of the present invention. Generally, a zeolite material, whether or not it contains a binder, or has been steamed, can be suspended in an acid solution. The concentration of the zeolite in the acid solution can be in the range of from about 0.01 to about 700, preferably about 0.1 to about 600, more preferably about 1 to about 550, and most preferably 5 to 500 grams per liter. The amount of acid required is the amount that can maintain the solution in acidic pH during the treatment. Preferably the initial pH of the acid solution containing a zeolite is adjusted to lower than about 7, preferably lower than about 6. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as that disclosed above. The mild acid treatment can also be carried out under substantially the same conditions disclosed in the acid treatment disclosed above. Thereafter, the resulting solid can be washed and dried as disclosed above.

It should be noted that, a zeolite can be acid-leached before it is treated with steam.

The dried, acid-leached zeolite, whether it has been further washed with a mild acid or not, can be either heated with steam or calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

A zeolite, a calcined zeolite, or a calcined zeolite-binder mixture, can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite, with predominantly ammonium ions. Techniques for such treatment are well known to one skilled in the art such as, for example, ion exchange of the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 800, preferably about 0.1 to about 500, more preferably about 1 to about 400, and most preferably 5 to 100 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined hydrogen-form zeolite. For the preparation of a calcined zeolite or zeolite-binder the drying and calcining processes can be carried out substantially the same as those disclosed above.

Generally, the ammonium-exchanged zeolite becomes hydrogen exchanged upon calcination or high temperature treatment such that a predominant proportion of its exchangeable cations are hydrogen ions. The above-described ion exchange of exchangeable ions in a zeolite is well known to one skilled in the art, therefore, the description of which is omitted herein for the interest of brevity.

In the second embodiment of the invention, a zeolite or a zeolite-binder mixture, which could have been steamed and/or acid-leached, in a desired ionic form, regardless whether calcined or not, can be combined with a clay and a promoter by the process disclosed above for producing zeolite-binder mixture to produce the composition of the invention. The composition can also be produced by contacting a zeolite and clay with a promoter compound, in a solution or suspension, under a condition known to those skilled in the art to incorporate a promoter compound into a zeolite. Because the methods for incorporating or impregnating a promoter compound into a zeolite a solid composition such as, for example, impregnation by incipient wetness method, are well known to those skilled in the art, the description of which is also omitted herein for the interest of brevity.

The composition of the invention then can be, if desired, pretreated with a reducing agent before being used in a transalkylation or hydrodealkylation process for converting a hydrocarbon to an olefin and an aromatic hydrocarbon. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours. The treatment with a reducing agent can also be carried out in-situ in a reactor which is used for a hydrocarbon conversion process.

According to the third embodiment of the present invention, a process useful for converting a hydrocarbon or a hydrocarbon mixture to a mixture rich in olefins and $C_6$ to $C_8$ aromatic hydrocarbons comprises, consists essentially of, or consists of contacting a fluid stream comprising a hydrocarbon or hydrocarbon mixture which can comprise paraffins, olefins, naphthenes, and aromatic compounds with a catalyst composition under a condition sufficient to effect the conversion of a hydrocarbon mixture to a mixture rich in olefins and $C_6$ to $C_8$ aromatic hydrocarbons or to enhance the weight ratio of olefins (ethylene and propylene) to the $C_6$ to $C_8$ aromatic compounds. The fluid stream also comprises a diluent selected from the group consisting of carbon dioxide, nitrogen, helium, carbon monoxide, steam, hydrogen, and combinations of two or more thereof. The presently preferred diluents are nitrogen and carbon dioxide for they are readily available and effective. The catalyst composition can be the same as that disclosed in the first embodiment of the invention and can be produced by the second embodiment of the invention. The weight ratio of the diluent to the hydrocarbon is in the range of from about 0.01:1 to about 10:1, preferably about 0.05:1 to about 5:1, and most preferably 0.1:1 to about 2:1.

The term "fluid" is used herein to denote gas, liquid, vapor, or combinations thereof. The term "hydrocarbon" is generally referred to, unless otherwise indicated, as one or more hydrocarbons having from about 4 carbon atoms to about 30 carbon atoms, preferably about 5 to about 20 carbon atoms, and most preferably 5 to 16 carbon atoms per molecule. The term "enhance or enhanced" refers to an increased weight ratio of olefins to BTX employing the catalyst composition as compared to employing only a zeolite such as commercially available ZSM-5. Examples of a hydrocarbon include, but are not limited to butane, isobutane, pentane, isopentane, hexane, isohexane, cyclohexane, heptane, isoheptane, octane, isooctane, nonane, decane, undecane, dodecane, tridecane, tetradecane, pentadecane, hexadecane, butenes, isobutene, pentenes, hexenes, benzene, toluene, ethylbenzene, xylenes, and combinations of any two or more thereof.

Any fluid which contains a hydrocarbon as disclosed above can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins and aromatic compounds (if present).

The contacting of a fluid feed stream containing a hydrocarbon with the catalyst composition can be carried out in any technically suitable manner, in a batch or semicontinuous or continuous process, under a condition effective to convert a hydrocarbon to a $C_6$ to $C_8$ aromatic hydrocarbon. Generally, a fluid stream as disclosed above, preferably being in the vaporized state, is introduced into an aromatization reactor having a fixed catalyst bed, or a moving catalyst bed, or a fluidized catalyst bed, or combinations of any two or more thereof by any means known to one skilled in the art such as, for example, pressure, meter pump, and other similar means. Because an aromatization reactor and aromatization are well known to one skilled in the art, the description of which is omitted herein for the interest of brevity. The condition can include a weight hourly space velocity of the fluid stream in the range of about 0.01 to about 100, preferably about 0.05 to about 50, and most preferably 0.1 to 30 g feed/g catalyst/hour. Generally, the pressure can be in the range of from about 0 to about 1000 psig, preferably about 0 to about 200 psig, and most preferably 0 to 50 psig, and the temperature is about 250 to about 1000° C., preferably about 350 to about 750° C., and most preferably 450 to 650° C.

The process effluent generally contains a light gas fraction comprising hydrogen and methane; a $C_2$–$C_3$ fraction containing ethylene, propylene, ethane, and propane; an intermediate fraction including non-aromatic compounds higher than 3 carbon atoms; and a BTX aromatic hydrocarbons fraction (benzene, toluene, ortho-xylene, meta-xylene and para-xylene). Generally, the effluent can be separated into these principal fractions by any known methods such as, for example, fractionation distillation. Because the separation methods are well known to one skilled in the art, the description of which is omitted herein. The intermediate fraction can be recycled to an aromatization reactor described above, methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of catalyst composition of the invention.

A ZSM-5 zeolite obtained from UCI (United Catalysts, Inc., Louisville, Ky.) having a product designation of T-4480 (obtained as a 1/16 inch extrudate) was used as control catalyst (catalyst A). Zeolite T-4480 contained 30 percent by weight of alumina as binder.

A ZSM-5 zeolite obtained from CU Chemie Uetikon AG, Uetikon, Switzerland having a product designation of Zeocat PZ 2/50 H (obtained as powder) was used to produce other catalyst compositions.

First, the zeolite powder was extruded, following the addition of just enough water to make a paste, to produce 1/16 inch extrudates which were calcined at 500° C. for 3 hours (catalyst B).

Secondly, 5 g of the Zeocat zeolite powder was mixed with 5 g of bentonite. Following the addition of just enough water to make a paste, the paste was extruded. The extrudates were heated to and at 500° C. for 3 hours in a muffle furnace to produce 10 g of a zeolite containing clay (catalyst C).

In another preparation, powder PZ 2/50H zeolite (24 g) was mixed with 6 g of bentonite to form a mixture followed by the addition of just enough water to form a paste. The paste was then extruded, dried, and calcined at 500° C. for 3 hours to produce 30 g of a zeolite containing 20 weight % clay (catalyst D).

Still in another preparation, 10 g of PZ 2/50 H was mixed with 2 g of bentonite followed by the procedure described above for Catalyst C to produce 12 g of a zeolite containing 16.7 weight % clay (catalyst E).

In a separate run, 20 g of PZ 2/50H powder zeolite was thoroughly mixed with 5 g of bentonite. Following the procedure described above for producing catalyst C, a zeolite (total 25 g) was produced (catalyst F) which contained 20 weight % clay by calculation.

Also in a separate run, 20 g of Zeocat zeolite PZ 2/50H was mixed with 5 g of stannous oxide and 5 g of bentonite to form a mixture. Following the procedure described above for Catalyst C, a zeolite (catalyst G) (30 g) containing 16.7 weight % tin and 16.7 weight % clay was produced.

Still in a separate run, 20 g of PZ 2/50H powder, 5 g of diatomaceous earth, and 5 g of bentonite were thoroughly mixed. Following the procedure described above for the production of catalyst C, a zeolite (catalyst H) containing 14.7 weight % diatomaceous earth and 16.7 weight % clay was produced.

Catalyst AA was produced by first mixing 18 g of PZ 2/50H powder, 7 g of bentonite, 0.6 g of zinc titanate, and enough water (21 ml) to make a paste. The paste was extruded to 1/16 inch extrudates. Following drying the extrudates at 500° C. for 3 hours, the extrudates were placed in a U-tube and heated with steam at 650° C. for 4 hours.

Catalyst BB was produced by first mixing 18 g of PZ 2/50H powder, 7 g of bentonite, 0.4 g of magnesium silicate, and enough water to make a paste. The paste was then extruded to 1/16 inch extrudates which were dried and heated with steam as above.

Catalyst CC was produced by first mixing 18 g of PZ 2/50H powder, 7 g of bentonite, 0.6 g of zinc titanate, 0.5 g of magnesium silicate, and 21 ml of $H_2O$ to make a paste. The paste was extruded, dried, and heated with steam, as disclosed above for preparing catalysts AA and BB.

Catalyst DD was produced by first mixing 18 g of PZ 2/5OH zeolite powder with 7 g of bentonite, 0.4 g of zinc orthosilicate, and 21 ml of water to make a paste. The paste was extruded, dried, and steamed as disclosed above for producing catalyst AA.

Catalyst EE was produced as follows. First, 36 g of PZ 2/50H zeolite was mixed with 14 g of bentonite, 0.8 g of zinc orthosilicate, and 47.5 ml of water to make a paste. Secondly, the paste was extruded, dried, and heated with steam as disclosed above for catalyst AA production to produce a Zn/Si-incorporated zeolite. Thirdly, the Zn/Si-incorporated zeolite was mixed with a triethylphosphate (TEP) solution containing 1.2 g of TEP and 20 g of n-hexane. The resulting mixture was left standing at about 20° C. for one hour to produce P-incorporated zeolite. Finally, following removal of excess hexane by evaporation, the P-incorporated zeolite was calcined at 530° C. for 3 hours. Catalyst DD contained 2 weight % phosphorus.

Catalyst FF was produced by the same produced described for catalyst EE except that the quantity of TEP used as 2.4 g. Catalyst FF contained 4 weight % phosphorus.

EXAMPLE II

This example illustrates the use of the catalyst compositions described in Example I as catalysts in the conversion of hydrocarbons to olefins and BTX.

A quartz reactor tube (inner diameter 1 centimeter; length 60 centimeter) was filled with a 20 centimeter bottom layer of Alundum® alumina (inert, low surface area alumina), 4.4 grams of one of the catalysts in the middle 20 centimeter of the tube, and a 20 centimeter top layer of Alundum® alumina. The liquid feed was a gasoline obtained from Phillips Petroleum Company, Bartlesville, Okla., and contained hydrocarbons shown in Table I. The liquid feed shown in Table I is summarized as: 38.7 weight percent (%) lights ($C_5$s and $C_6$s); 1.3% benzene; 5.4% toluene; 8.1% $C_8$ aromatics; 38.9% nonaromatics in BTX boiling range; and 25.9% heavies ($C_8+$). The feed was introduced into the reactor at a rate of 12 ml/hour (8.95 g/hour). The reaction temperature was 600° C. The reactor effluent was cooled and separated into a gaseous phase and a liquid phase by passing through a wet ice trap for liquid product collection and then through a wet test meter for gas volume measurement. The liquid was weighed hourly and analyzed on a Hewlett-Packard 5890 gas chromatograph equipped with a fused silica column (DB- 1). The gas was sampled hourly after the ice trap and analyzed on a Hewlett-Packard 5890 gas chromatograph using a HP-PLOT/$Al_2O_3$ column. The gas was also analyzed for hydrogen content on a Carle gas chromatograph using hydrocarbon trap followed by a 13X molecular sieve column. Both phases were analyzed by gas chromatographs at intervals of about 1 hour. The results of the runs at about 6 hours are shown in Table II below which illustrates the production of olefins and BTX from the Table I feed and individual catalyst compositions produced in Example I.

TABLE I

Hydrocarbon Analysis of Catalytically Cracked Gasoline

|  | n-paraffins | Isoparaffins | Aromatics | Naphthenes | Olefins | Total |
|---|---|---|---|---|---|---|
| $C_1$ | 0.000 | 0.000 | 0.000 | 0.000 | 0.000 | 0.000 |
| $C_2$ | 0.000 | 0.000 | 0.000 | 0.000 | 0.000 | 0.000 |
| $C_3$ | 0.000 | 0.000 | 0.000 | 0.000 | 0.000 | 0.000 |
| $C_4$ | 0.000 | 0.000 | 0.000 | 0.000 | 0.018 | 0.018 |
| $C_5$ | 1.292 | 8.147 | 0.000 | 0.169 | 10.741 | 20.348 |
| $C_6$ | 0.749 | 7.164 | 1.266 | 1.972 | 7.135 | 18.287 |
| $C_7$ | 0.740 | 4.576 | 5.354 | 2.746 | 6.483 | 19.899 |
| $C_8$ | 0.760 | 3.234 | 8.120 | 2.531 | 0.830 | 15.475 |
| $C_9$ | 0.187 | 2.070 | 8.187 | 0.708 | 0.125 | 11.278 |
| $C_{10}$ | 0.163 | 1.193 | 5.155 | 0.072 | 0.048 | 6.631 |
| $C_{11}$ | 0.153 | 0.307 | 3.606 | 0.191 | 0.000 | 4.257 |

TABLE I-continued

Hydrocarbon Analysis of Catalytically Cracked Gasoline

|  | n-paraffins | Isoparaffins | Aromatics | Naphthenes | Olefins | Total |
|---|---|---|---|---|---|---|
| $C_{12}$ | 0.115 | 0.974 | 0.768 | 0.088 | 0.000 | 1.946 |
| $C_{13}$ | 0.048 | 0.000 | 0.000 | 0.000 | 0.000 | 0.048 |
| $C_{14}$ | 0.000 | 0.000 | 0.000 | 0.000 | 0.000 | 0.000 |
| Total | 4.208 | 27.664 | 32.457 | 8.478 | 23.381 | 98.188 |
|  |  |  |  |  | Total $C_{15}+$ | 0.108 |
|  |  |  |  |  | Total Unknowns: | 1.704 |

TABLE II

Olefins and BTX Production (weight percent in product)

| Catalyst | $C_2^=$ | $C_3^=$ | BTX | Total | % Coke | Olefin BTX |
|---|---|---|---|---|---|---|
| A (T4480) | 6.4 | 6.8 | 42 | 54.7 | 4.4 | .31 |
| B (PZ 2/50H) | 6.6 | 8.5 | 38 | 53.1 | 4.9 | .40 |
| C (PZ 2/50H + clay) | 7.0 | 12.0 | 26 | 46.0 | ND | .77 |
| D (PZ 2/50H + clay) | 9.8 | 8.9 | 41 | 59.7 | 1.7 | .46 |
| E (PZ 2/50H + clay) | 6.6 | 5.4 | 44 | 56.0 | 1.2 | .39 |
| F (PZ 2/50H + clay) | 7.8 | 6.8 | 42 | 56.6 | 1.2 | .35 |
| G (PZ 2/50H + clay + SnO) | 4.4 | 11.8 | 35 | 51.2 | 0.4 | .46 |
| H (PZ 2/50H + clay + diatomaceous earth) | 9.2 | 12.9 | 30 | 52.1 | 0.8 | .74 |
| AA (PZ 2/50H + clay + $ZnTiO_3$) | 7.0 | 14.2 | 34 | 55.2 | 0.44 | .62 |
| BB (PZ 2/50H + clay + $MgSiO_3$) | 7.0 | 13.6 | 27 | 47.6 | 0.6 | .76 |
| CC (PZ 2/50H + clay + $ZnTiO_3$ + $MgSiO_3$) | 7.2 | 13.8 | 37 | 58.0 | 0.2 | .54 |
| DD (PZ 2/50H + clay + $Zn_2SiO_4$) | 7.8 | 11.8 | 40.5 | 60.1 | 0.28 | 0.48 |
| EE (PZ 2/50H + clay + $Zn_2SiO_4$ + TEP) | 6.9 | 14.1 | 35.1 | 56.1 | 0.15 | 0.60 |
| FF (PZ 2/50H + clay + $Zn_2SiO_4$ + TEP) | 5.2 | 13.4 | 24.9 | 43.5 | 0.24 | 0.75 |

The WHSV (weight hourly space velocity) of gasoline feed for each run was 2; coke was determined at the end of the reaction by removing the catalysts from the reactor and determined with a thermal gravimetric analyzer (TGA), manufactured by TA Instruments, New Castle, Delaware; ND, not determined; TEP, triethylphosphate.

Table II shows that commercial ZSM-5 zeolite (catalyst A) containing alumina binder had a high coke yield in a gasoline aromatization reaction. Table II also shows that a ZSM-5 zeolite (catalyst B) which did not contain alumina binder also had a high coke yield. Addition of a bentonite clay at various concentrations (catalysts D to F) significantly lowered the amount of coke yield. Table II further shows that increasing the ratio of zeolite to clay increased the ratio of olefins to BTX in the product stream (catalysts C and D). The results presented in Table II further demonstrate that a zeolite containing clay and either stannous oxide (catalyst G) or diatomaceous earth (catalyst H) not only significantly further reduced the coke formation but also increased the ratio of olefins to BTX. Furthermore, Table II shows that incorporation of $ZnTiO_3$ (catalyst AA), $MgSiO_3$ (catalyst BB), or both $ZnTiO_3$ and $MgSiO_3$ (catalyst CC) also significantly improved the production of olefins and reduced coke formation. Finally, Table II shows that incorporation of $Zn_2SiO_4$ (catalyst DD), or both $Zn_2SiO_4$ and phosphorus (catalyst EE had 2 weight % P and catalyst FF contained 4 weight % P), had profound effect on reduction of coke formation in an aromatization process.

EXAMPLE III

This example illustrates another embodiment of the invention.

A Zeocat zeolite (catalyst I) containing about 70 weight % PZ 2/50H zeolite and 30% clay binder was a commercially available product obtained as 1/16 inch extrudates.

Catalyst I (164 g) was mixed with 164 g of 37 weight % HCl and 164 g of water to make a suspension. The suspension was heated to and at 90° C. for 2 hours to produce a heated suspension. Following the removal of aqueous phase by decantation from the suspension, the solid was washed with a running tap water for about 30 minutes and then dried at 125° C. for 2 hours. The dried solid was then calcined in air in a muffle furnace at 500° C. for 4 hours to produce 158.58 g of an acid-leached clay-bound ZSM-5 (catalyst J).

A portion (50 g) of catalyst J was steamed (20 ml $H_2O$/hr) at 650° C. in a U-shape tube for 8 hours to produce an acid-leached (AL)-steamed zeolite (catalyst K).

In a separate run, 200 g of catalyst I was steamed as described immediately above to produce a steamed zeolite. The steamed zeolite (44 g) was added to a flask containing 44 ml of $H_2O$ and 52 ml of HCl to produce a suspension. The suspension was heated to and then at 90° C. for 2 hours. Following removal of the aqueous phase by decantation, the solid was washed with running tap water for about 30 minutes. The washed solid was dried in an oven at 125° C. for 3 hours followed by calcination in a muffle furnace at 500° C. for 3 hours to produce 40.54 g of steam and acid-leached zeolite (catalyst L).

The above catalysts I, J, K, and L were employed in a gasoline aromatization process for converting gasoline to olefins and BTX using the procedure disclosed in Example II. The purity of BTX was determined by dividing the area % of BTX in a GC chromatogram by the area % of all products in the same GC chromatogram. The results are shown in Table III below.

TABLE III

| Catalyst | Product (weight %) | | | Purity | Ratio Olefins/BTX | % Coke |
|---|---|---|---|---|---|---|
| | $C_2^-$ | $C_3^-$ | BTX | | | |
| I (PZ 2/50H + clay) | 7.3 | 9.2 | 36 | 97 | .46 | 5.6 |
| J (AL-catalyst I) | 8.1 | 7.3 | 40 | 97 | .39 | 1.1 |
| K (AL-steam-catalyst I) | 10.0 | 14.3 | 26 | 87 | .93 | 0.4 |
| L (steam-AL-catalyst I) | 10.6 | 13.3 | 30 | 94 | .80 | 0.4 |

AL, acid-leached; AL-steam; acid-leaching followed by steam treatment; steam-AL; steam treatment followed by acid-leaching.

Table III shows that commercially available PZ 2/50 H zeolite probably also contained (contaminated with) some alumina binder which could be removed by acid-leaching. The results in Table III also show that acid-leaching substantially decreased coke formation (catalyst J). Table III also shows that the coke content was further reduced and the ratio of olefins to BTX was further enhanced by an acid, steam, or both, treatment. Finally, Table III shows that the treatments of zeolite catalyst described in the invention did not adversely affect the BTX purity.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising a ZSM-5 zeolite, a clay, and a promoter which comprises a zinc compound and a phosphorus compound, wherein said zinc compound is selected from the group consisting of zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc phosphate, zinc acetate dihydrate, diethylzinc, zinc 2-ethylhexanoate, and combinations of two or more thereof, wherein said phosphorus compound is selected from the group consisting of phosphorus pentoxide, phosphorus oxychloride, phosphoric acid, phosphines, phosphites, phosphates, and combinations of two or more thereof, and wherein the weight ratio of clay to zeolite is in the range of from about 1:20 to about 20:1 and the weight ratio of promoter to zeolite is in the range of from about 0.01:1 to 1:1.

2. A composition according to claim 1 wherein the weight ratio of clay to zeolite is in the range of from about 1:7 to about 5:1 and the weight ratio of promoter to zeolite is in the range of from about 0.04:1 to about 0.5:1.

3. A composition according to claim 1 wherein said zinc compound is zinc silicate and said phosphorus compound is triethyl phosphate.

4. A composition comprising ZSM-5 zeolite, bentonite, and a promoter which comprises zinc silicate and triethyl phosphate wherein the weight ratio of clay to zeolite is in the range of from about 1:20 to about 20:1 and wherein the weight ratio of promoter to zeolite is in the range of from about 0.01:1 to about 1:1.

5. A composition according to claim 4 wherein the weight ratio of clay to zeolite is in the range of from about 1:7 to about 5:1 and the weight ratio of promoter to zeolite is in the range of from about 0.04:1 to about 0.5:1.

6. A process comprising the steps of: (1) combining a ZSM-5 zeolite, a clay, and a zinc compound under a condition sufficient to produce a clay-bound zeolite; (2) steaming said clay-bound zeolite to produce a modified zeolite; (3) contacting said modified zeolite with a phosphorus compound under a condition sufficient to incorporate said phosphorus compound into said modified zeolite to produce a Zn- and P-containing zeolite; and (4) calcining said zinc- and phosphorus-containing zeolite, wherein said zinc compound is selected from the group consisting of zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc phosphate, zinc acetate dehydrate, diethylzinc, zinc 2-ethylhexanoate, and combinations of two or more thereof, wherein said phosphorus compound is selected from the group consisting of phosphorus pentoxides, phosphorus oxychloride, phosphoric acid, phosphines, phosphites, phosphates, and combinations of two or more thereof, wherein said zinc compound is selected from the group consisting of zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc phosphate, zinc acetate dehydrate, diethylzinc, zinc 2-ethylhexanoate, and combinations of two or more thereof; and wherein said phosphorus compound is selected from the group consisting of phosphorus pentoxide, phosphorus oxychloride, phosphoric acid, phosphines, phosphites, phosphates, and combinations of two or more thereof.

7. A process according to claim 6 wherein said clay is bentonite, said zinc compound is zinc silicate and said phosphorus compound is triethyl phosphate.

* * * * *